(12) United States Patent
Inoue et al.

(10) Patent No.: US 6,843,492 B2
(45) Date of Patent: Jan. 18, 2005

(54) VEHICULAR SUSPENSION

(75) Inventors: Mitsuru Inoue, Tochigi (JP); Junichi Midorikawa, Tochigi (JP)

(73) Assignee: F. Tech Incorporation, Saitama (JP)

( * ) Notice: Subject to any disclaimer, the term of this patent is extended or adjusted under 35 U.S.C. 154(b) by 138 days.

(21) Appl. No.: 10/388,372

(22) Filed: Mar. 13, 2003

(65) Prior Publication Data

US 2004/0100062 A1 May 27, 2004

(30) Foreign Application Priority Data

Nov. 22, 2002 (JP) ........................................ 2002-339168

(51) Int. Cl.[7] ................................................ B60G 3/18
(52) U.S. Cl. ........................ 280/124.135; 280/124.143; 280/124.148
(58) Field of Search ................... 280/124.134, 124.135, 280/124.143, 124.144, 124.145, 124.148, 124.14, 124.128, 124.13, 124.132

(56) References Cited

U.S. PATENT DOCUMENTS

| | | | |
|---|---|---|---|
| 4,415,178 A | * 11/1983 | Hatsushi et al. | ...... 280/124.145 |
| 4,671,532 A | * 6/1987 | Matschinsky et al. | ...... 280/124.135 |
| 4,740,011 A | * 4/1988 | Mitobe et al. | ........ 280/124.131 |
| 5,478,103 A | * 12/1995 | Maeda et al. | ......... 280/124.152 |
| 5,895,063 A | * 4/1999 | Hasshi et al. | ......... 280/124.134 |

* cited by examiner

Primary Examiner—Peter C. English
(74) Attorney, Agent, or Firm—Carrier, Blackman & Associates, P.C.; Joseph P. Carrier; William D. Blackman

(57) ABSTRACT

A vehicular suspension includes a trailing arm and a substantially plate-like lower arm. The trailing arm is pivotably supported at its front end on a vehicle body via an elastic joint and extends from the front end toward the rear of the vehicle body. The lower arm extends in the vehicle width direction with its inner end pivotably supported on the vehicle body and its outer end fixed to a rear part of the trailing arm. A flat first seating surface of an end plate welded to the rear end of the trailing arm is superimposed on a flat second seating surface provided at the outer end of the lower arm, and an inner periphery of a closed rectangular opening formed on the second seating surface is welded to the first seating surface by a weld. The second seating surface of the lower arm protrudes from a main body portion via a slant surface.

2 Claims, 8 Drawing Sheets

VEHICULAR SUSPENSION

BACKGROUND OF THE INVENTION

1. Field of the Invention

The present invention relates to a vehicular suspension that includes a trailing arm extending in the longitudinal direction of a vehicle body and a flexible arm extending in the vehicle width direction, wherein the outer end of the flexible arm is connected to the rear end of the trailing arm and flexes rearward when a wheel is braked, thereby making the wheel toe-in.

2. Description of the Related Art

Figure 7:
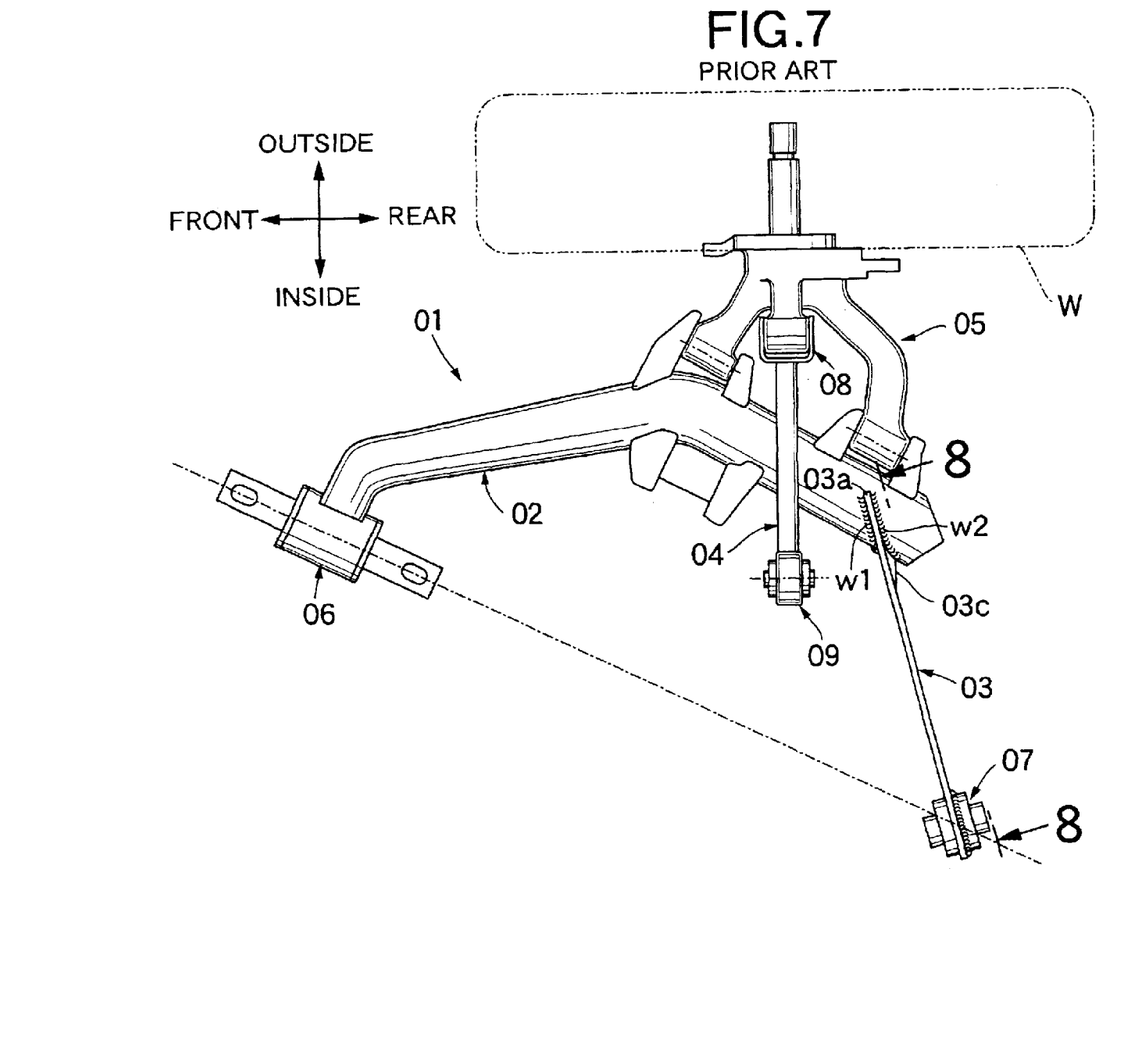
FIG. 7 is a plan view of a conventional suspension of a right rear wheel.
Figure 8:
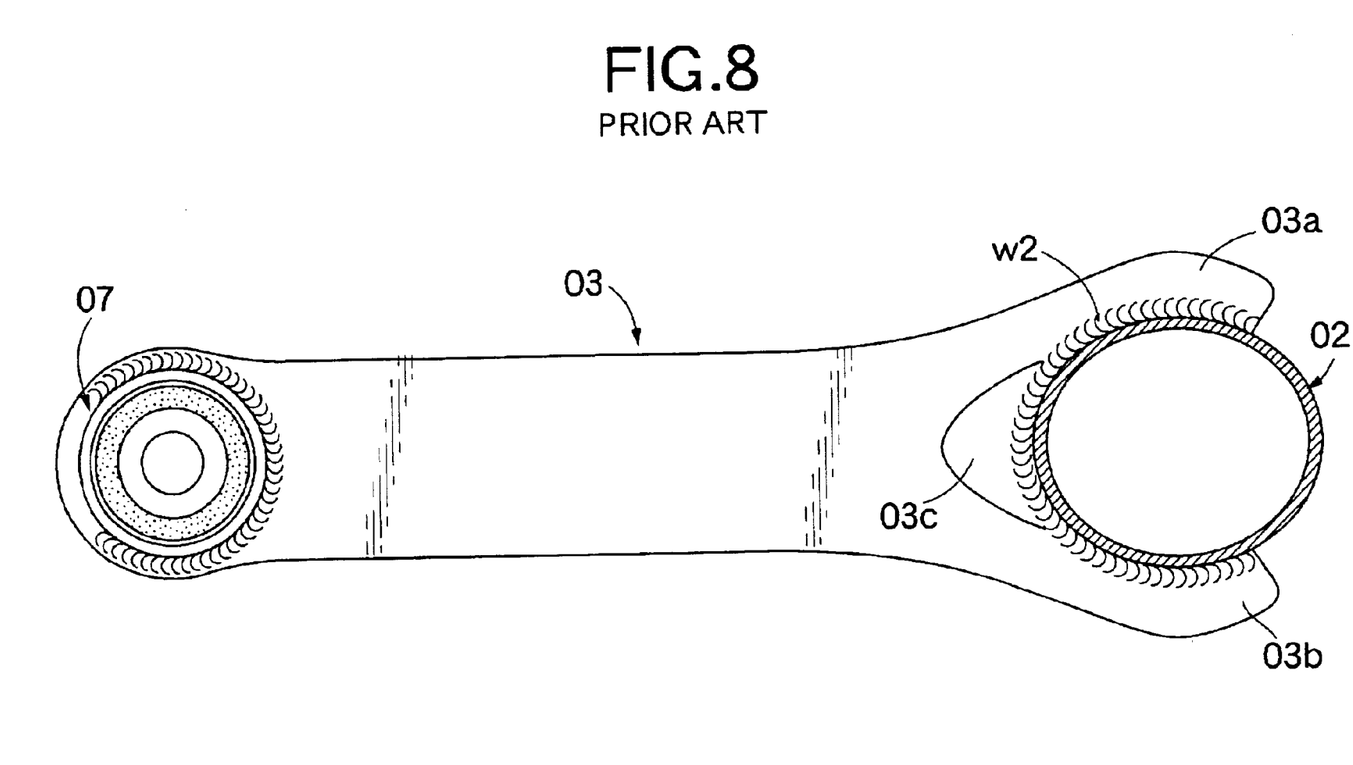
FIG. 8 is a cross section along line 8—8 in FIG. 7.

FIG. 7 and FIG. 8 show a conventional vehicular suspension. A suspension 01 suspends a wheel W (right rear wheel) and includes a trailing arm 02, a lower arm 03, an upper arm 04, and a knuckle 05. The front end of the trailing arm 02 is pivotably supported on a vehicle body via a joint 06. The inner end of the lower arm 03 is pivotably supported on the vehicle body via a joint 07. The outer end of the lower arm 03 is welded to the rear end of the trailing arm 02. The outer end and the inner end of the upper arm 04 are pivotably supported via joints 08, 09 on the knuckle 05 and the vehicle body respectively.

The lower arm 03 is a substantially plate-like member with a bifurcated outer end including a first support portion 03*a* and a second support portion 03*b*. An expanded portion 03*c* is formed at the base parts of the first and second support portions 03*a*, 03*b*, and protrudes toward one side in the thickness direction of the lower arm 03. While the first and second support portions 03*a*, 03*b* of the lower arm 03 are in a state in which they are fitted around the outer periphery of a rear part of the trailing arm 02, the outer peripheral surface of the trailing arm 02 and the front surface of the lower arm 03 are welded by a weld w1, and the outer peripheral surface of the trailing arm 02 and the rear surface of the lower arm 03 are welded by a weld w2.

In this suspension 01, when a rearward load acts on the knuckle 05 when the wheel W is braked, the outer end of the lower arm 03 flexes rearward and at the same time the front end of the trailing arm 02 moves rearward and inward, thus making the wheel W toe-in to stabilizes the vehicle behavior during braking.

In this type of suspension 01, a large load acts on the welds w1 and w2 between the rear end of the trailing arm 02 and the outer end of the lower arm 03, causing a problem that the strength and the durability decrease. That is, the welds w1 and w2 receive not only a load accompanying vertical movement of the wheel W, but also a tensile load to peel off the weld w2 on the rear side in the case where a rearward load acts on the knuckle 05 when the wheel W is braked, and a tensile load to peel off the weld w1 on the front side in the case where a forward load acts on the knuckle 05 when the vehicle is accelerated. In particular, the load when braking is larger than that when accelerating.

Since the lower arm 03 is formed from a plate-like material, the lower arm 03 and the trailing arm 02 are in substantially line contact with each other, so that it is difficult to obtain a sufficient weld strength. In the above-mentioned conventional arrangement, the expanded portion 03*c* is formed on the base parts of the bifurcated first and second support portions 03*a* and 03*b* so as to improve the strength of the welds w1 and w2, but it is difficult to increase the strength and the durability of the welds w1 and w2 by the expanded portion 03*c* alone.

Furthermore, in the above-mentioned conventional arrangement, since the welds w1 and w2 are formed on the front side and the rear side respectively of the lower arm 03, it is necessary to change the attitude of the trailing arm 02 and the lower arm 03 during welding, thereby degrading the workability. Further, since the beads of the welds w1 and w2 have end parts, stress might be concentrated in the end parts, causing a problem that they easily become the starting point for a fracture. Moreover, since the bifurcated first and second support portions 03*a* and 03*b* are formed at the outer end of the lower arm 03, the vertical dimension of the lower arm 03 increases, causing a problem that the degrees of freedom are decreased in designing the suspension 01.

SUMMARY OF THE INVENTION

The present invention has been achieved in view of the above-mentioned circumstances, and it is an object of the present invention to improve the workability of welding, improve the strength and the durability of a weld, reduce the size of the weld, and increase the degrees of freedom in designing the weld, when a trailing arm and a flexible arm of a suspension are welded to each other.

In order to accomplish the above object, in accordance with a first aspect of the present invention, there is proposed a vehicular suspension comprising: a trailing arm pivotably supported at its front end on a vehicle body via an elastic joint and extending from the front end toward the rear of the vehicle body; and a substantially plate-like flexible arm extending in the vehicle width direction with its inner end pivotably supported on the vehicle body and its outer end fixed to a rear part of the trailing arm, the outer end of the flexible arm flexing rearward due to a rearward braking load acting on a rear part of the trailing arm when a wheel is braked, thereby allowing the elastic joint to move rearward and inward so as to make the wheel toe-in; wherein a flat first seating surface provided at the rear end of the trailing arm is superimposed on a flat second seating surface provided at the outer end of the flexible arm, and an inner periphery of a closed opening formed on the second seating surface or an inner periphery of a channel with one end open formed on the second seating surface is welded to the first seating surface.

With this arrangement, the flat first seating surface provided at the rear end of the trailing arm and the flat second seating surface provided at the outer end of the flexible arm are superimposed on each other, and the inner periphery of the closed opening formed on the second seating surface or the inner periphery of the channel with one end open formed on the second seating surface is welded to the first seating surface. Therefore, when a longitudinal load acts on the wheel W and the outer end of the flexible arm flexes longitudinally, the stress acting on the weld can be reduced, thereby enhancing the strength and the durability of the weld. In particular, since the first and second seating surfaces are in surface contact with each other, and the weld is formed along the inner periphery of the opening or the channel formed on the second seating surface of the flexible arm, it is possible to eliminate the starting point of a weld bead, which is a drawback in terms of the strength, thus further enhancing the reliability of the weld, and it is also possible to minimize the length of the weld bead, thereby contributing to reduction of the operation time and the cost.

Further, since both the first and second seating surfaces are flat, not only is the mutual positioning of the two seating surfaces during welding easy, but also the welding can be carried out while the first seating surface is fixed so as to face upward, thus eliminating the need for changing the attitude of the trailing arm and the flexible arm to improve the workability of the welding. Furthermore, since the two flat seating surfaces can slide over each other, the relative positions thereof can be changed easily.

Moreover, since there is no need to make an outer end part of the flexible arm in a bifurcated shape and to sandwich a rear end part of the trailing arm from above and below, the height of the outer end part of the flexible arm can be made to substantially coincide with the height of the rear end part of the trailing arm, thus reducing the vertical dimension of the outer end part of the flexible arm to increase the degrees of freedom in the design.

Furthermore, in accordance with a second aspect of the present invention, in addition to the arrangement of the first aspect, there is proposed a vehicular suspension wherein the second seating surface projects relative to a main body portion of the flexible arm in the thickness direction of the flexible arm.

In accordance with this arrangement, since the second seating surface projects relative to the main body portion of the flexible arm, the rigidity of the flexible arm can be increased in the vicinity of the second seating surface, thereby further improving the strength and the durability of the weld.

A lower arm 13 of an embodiment corresponds to the flexible arm of the present invention, and a joint 16 of the embodiment corresponds to the elastic joint of the present invention.

The above-mentioned object, other objects, characteristics and advantages of the present invention will become apparent from an explanation of preferred embodiments that will be described in detail below by reference to the attached drawings.

BRIEF DESCRIPTION OF THE DRAWINGS

FIGS. 1 to 5 show a first embodiment of the present invention.

DESCRIPTION OF PREFERRED EMBODIMENTS

Figure 1:
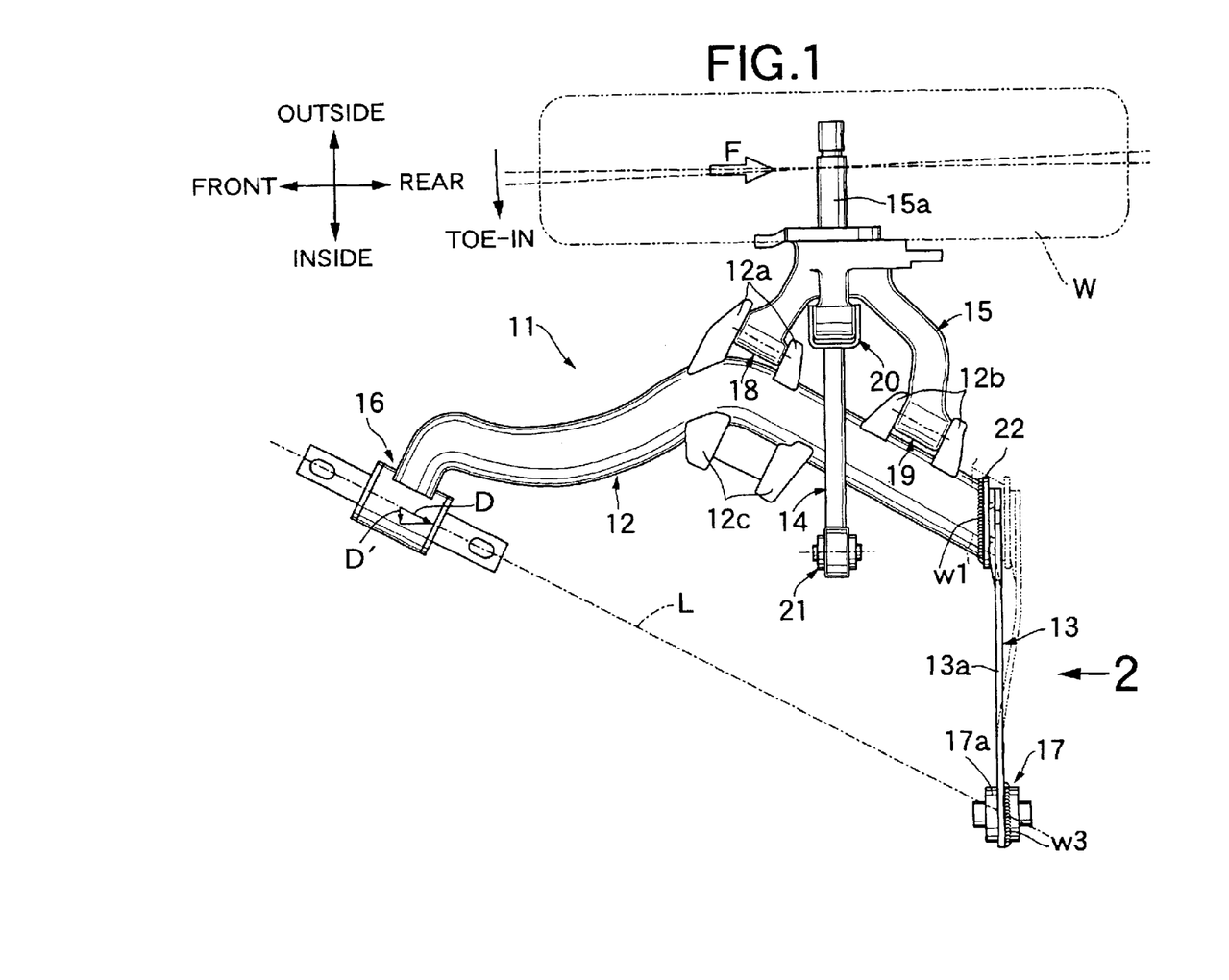
FIG. 1 is a plan view of a suspension of a right rear wheel.

Referring to FIG. 1, a suspension 11 suspends a wheel W (right rear wheel) and includes a trailing arm 12, a lower arm 13, an upper arm 14, and a knuckle 15. The wheel W is rotatably supported on an axle 15a extending from the knuckle 15 outward in the vehicle width direction.

The trailing arm 12 is formed by bending a pipe material having a circular cross-section, the front end thereof is pivotably supported on a vehicle body via a joint 16, the rear end thereof is welded to the outer end of the lower arm 13, and the inner end of the lower arm 13 is pivotably supported on the vehicle body via a joint 17. Provided at positions to the rear of the middle of the trailing arm 12 are front brackets 12a and rear brackets 12b pivotably supporting lower parts of the knuckle 15 via joints 18, 19. Pivotably supported via a joint 20 on an upper part of the knuckle 15 is the outer end of the upper arm 14 with its inner end being pivotably supported on the vehicle body via a joint 21.

The trailing arm 12 and the lower arm 13 thus united can swing up and down around an axis L passing through the joint 16 at the front end of the trailing arm 12 and the joint 17 at the inner end of the lower arm 13. This axis L is tilted from the outside to the inside in the vehicle width direction while running from the front to the rear.

Lower ends of a coil spring and a shock absorber, which are not illustrated, are supported on brackets 12c provided on the trailing arm 12.

Since a rearward load F acts on the wheel W from the road surface when the wheel W is braked, the outer end of the plate-like lower arm 13 flexes rearward (see broken chain line), and the joint 16, which is a rubber bush joint, acts so as to make the front end of the trailing arm 12 move rearward by only a distance D along the axis L. As a result, the front end of the trailing arm 12 moves inward in the vehicle width direction by only a distance D'. However, since the rear end of the trailing arm 12 connected to the outer end of the lower arm 13 hardly moves in the vehicle width direction, the trailing arm 12 swings in the anticlockwise direction in FIG. 1, thus making the wheel W toe-in to stabilize the vehicle behavior during braking.

The structure of a section where the trailing arm 12 and the lower arm 13 are connected to each other is explained by reference to FIGS. 2 to 5.

The rear end of the trailing arm 12 is truncated diagonally with respect to its axis. The resulting elliptical cross section and a round-cornered rectangular end plate 22 are abutted against each other and fixed by a weld w1. Formed on the rear surface of the end plate 22 is a flat first seating surface 22a that extends in the vehicle width direction.

A flat second seating surface 13b is formed on a front surface in an outer end part of a plate-like main body portion 13a of the lower arm 13. The second seating surface 13b projects forward by a predetermined distance (for example, approximately 3 to 5 mm) relative to the main body portion 13a. A U-shaped slant surface 13c (see FIG. 2) opening toward the outer end of the lower arm 13 is formed between the main body portion 13a and the second seating surface 13b. Formed on the second seating surface 13b of the lower arm 13 is a round-cornered rectangular opening 13d, the inner periphery thereof being fixed to the first seating surface 22a of the end plate 22 by a weld w2. Straight line sections of the opening 13d are positioned parallel to and orthogonal to the longitudinal direction of the lower arm 13.

Figure 2:
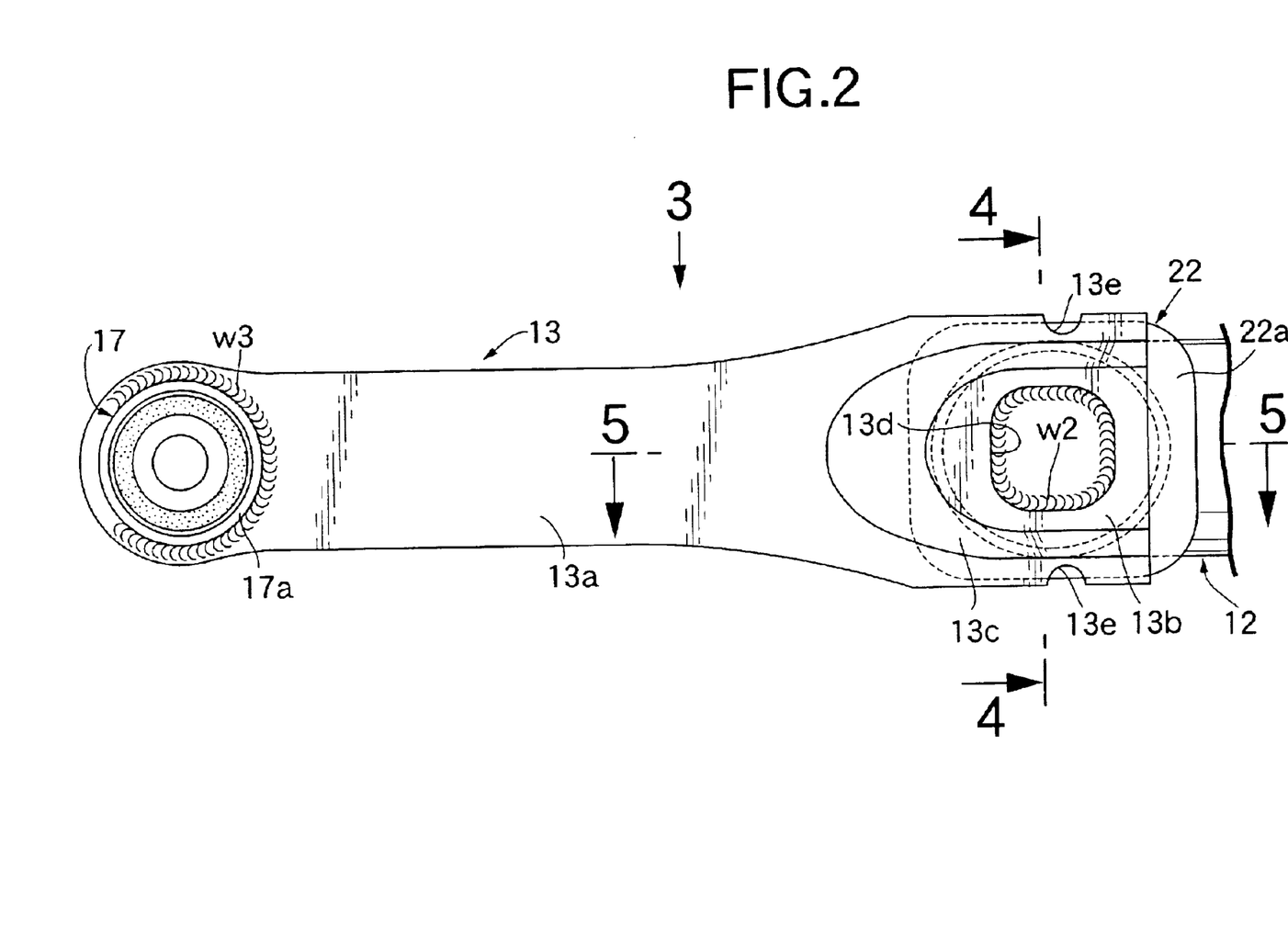
FIG. 2 is a magnified view taken from arrow 2 in FIG. 1.
Figure 3:
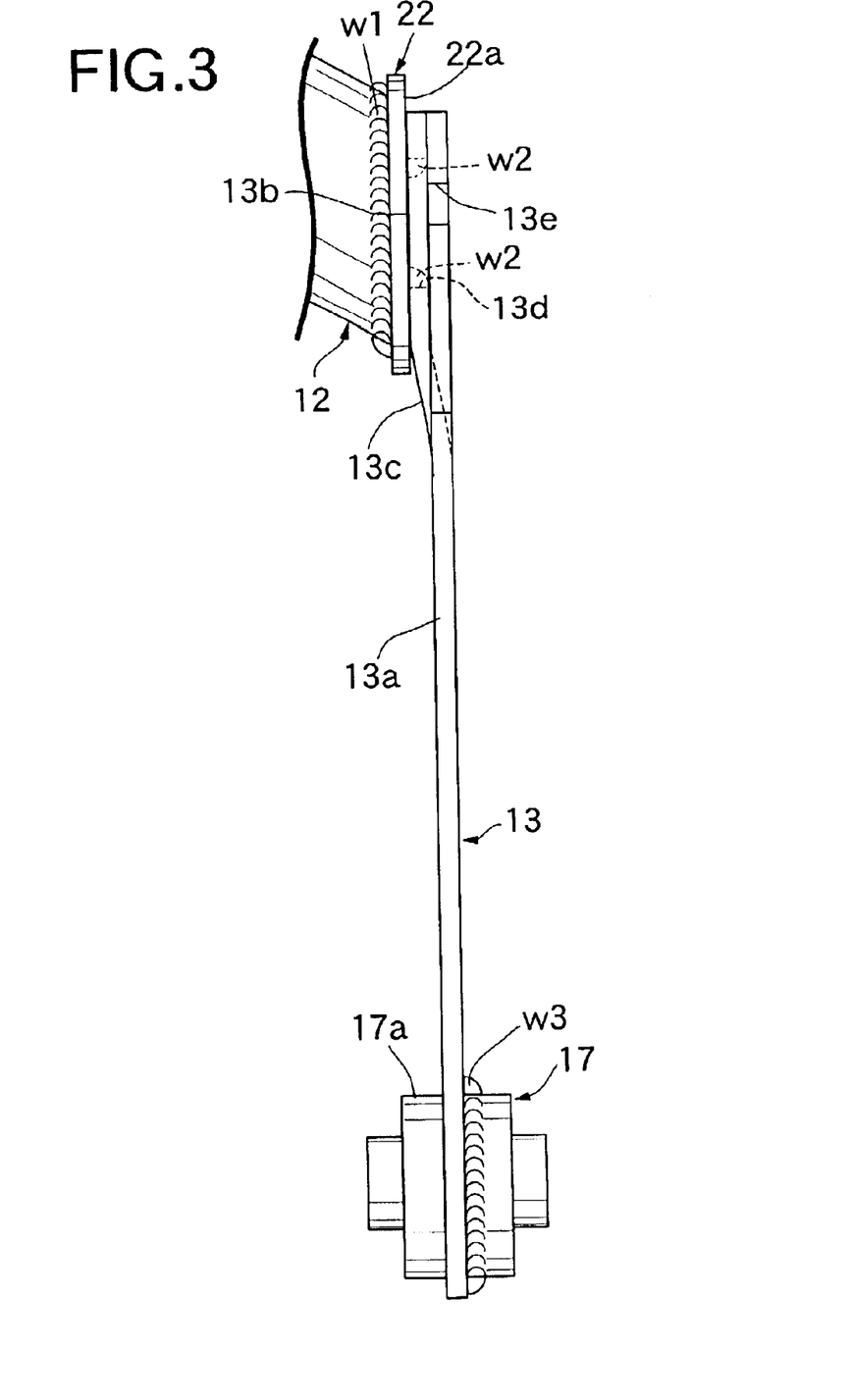
FIG. 3 is a view taken from arrow 3 in FIG. 2.
Figure 4:
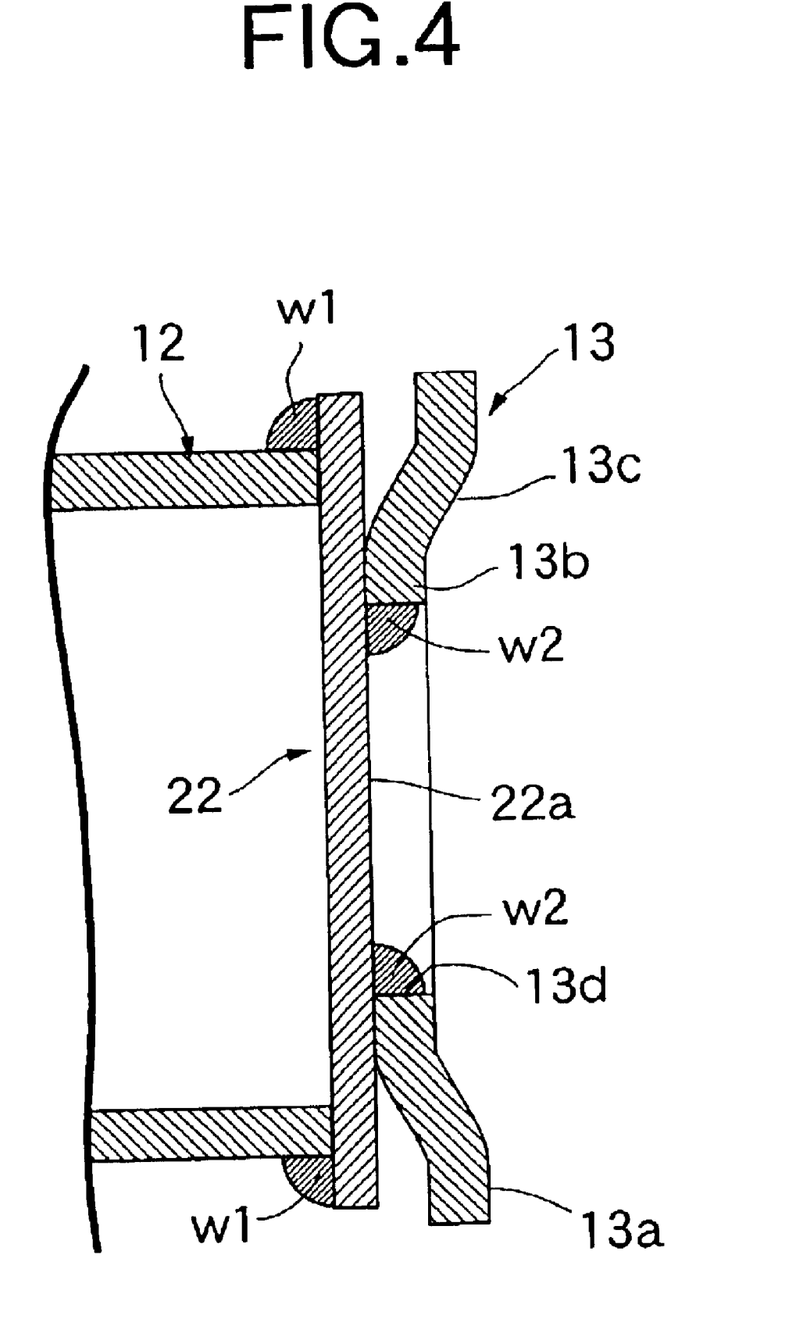
FIG. 4 is a magnified cross section along line 4—4 in FIG. 2.

Formed at upper and lower edges in an outer end part of the lower arm 13 are semicircular recesses 13e for positioning the lower arm 13 when welding the second seating surface 13b of the lower arm 13 to the first seating surface 22a of the end plate 22.

A short piece of pipe material, which is an outer member 17a of the joint 17, is fixed by a weld w3 to the inner end of the lower arm 13.

When the rearward load F acts on the wheel W (see FIG. 1), the lower arm 13 flexes rearward, thus generating a load that acts so as to peel off the weld w2 between the first seating surface 22a of the end plate 22 at the rear end of the trailing arm 12 and the second seating surface 13b at the outer end of the lower arm 13. However, since both the first seating surface 22a and the second seating surface 13b are flat and in intimate contact with each other and the surroundings of the second seating surface 13b are reinforced by the slant surface 13c to increase the flexural rigidity, the stress acting on the weld w2 can be reduced, thereby improving the strength and the durability.

Figure 5:
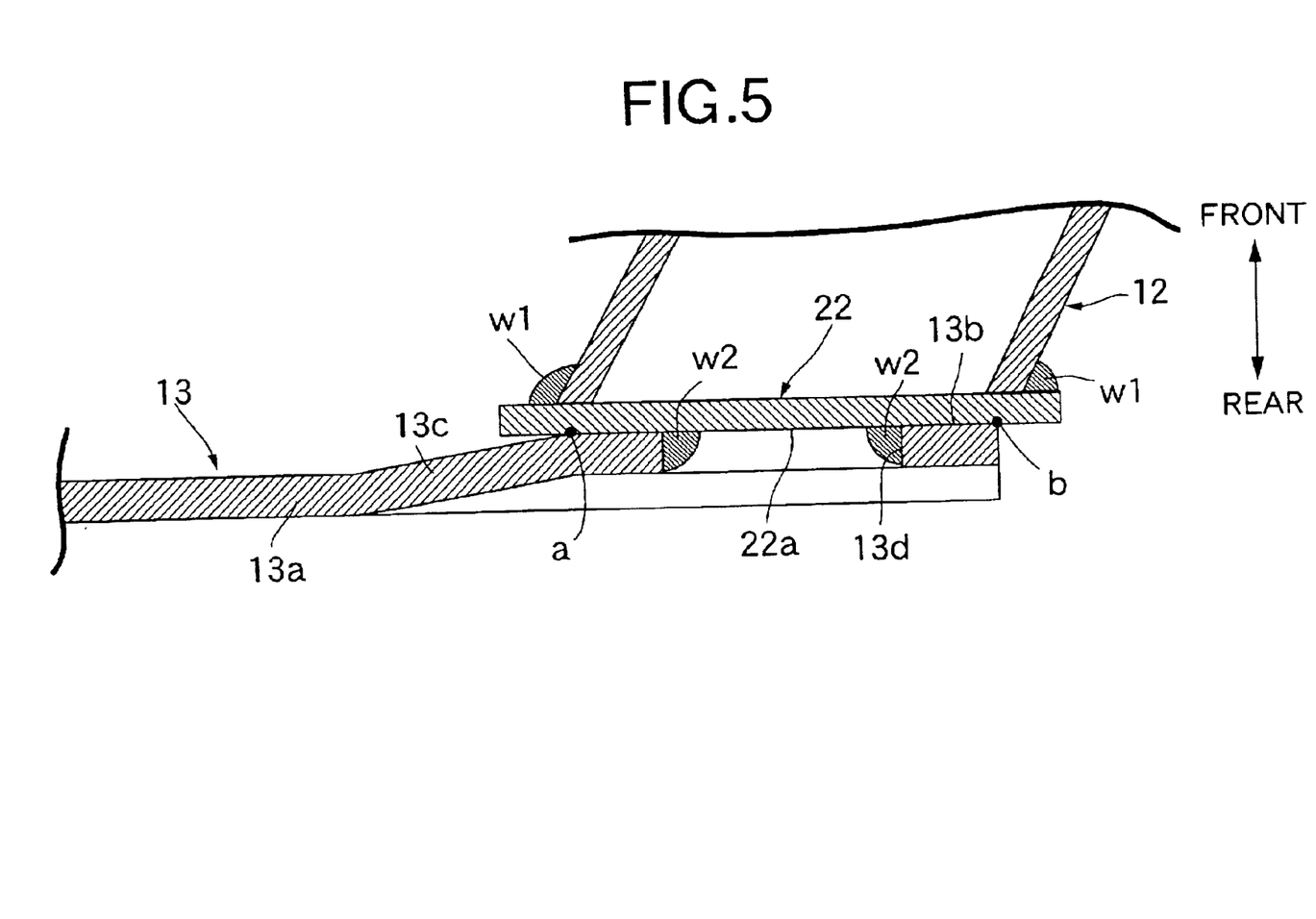
FIG. 5 is a magnified cross section along line 5—5 in FIG. 2.

This operation is further explained by reference to FIG. 5. If the rearward load is applied to the rear end of the trailing arm 12 when the wheel W is braked, a tensile load that depends on the flexural rigidity of the lower arm 13 acts on the entire periphery of the weld w2 using a point a as the fulcrum point. Since the lower arm 13 has a low flexural rigidity and can deform easily in the longitudinal direction, and the rigidity of the surroundings of the weld w2 is increased by the slant surface 13c, the tensile stress acting on the weld w2 is averaged over the entire periphery. Consequently, it is possible to avoid concentration of the stress on the point a, which is a drawback of the conventional arrangement, thus lowering the maximum stress of the weld w2 to greatly improve the durability. On the other hand, if a forward load is applied to the rear end of the trailing arm 12 when the vehicle is accelerated, etc., a tensile stress that depends on the flexural rigidity of the lower arm 13 acts on the entire periphery of the weld w2 using a point b as the fulcrum point. However, since the load during acceleration is about half of the load during braking, the load during acceleration does nor affect the durability of the weld w2.

Furthermore, since both the first seating surface 22a and the second seating surface 13b are flat, not only it is easy to position the first seating surface 22a and the second seating surface 13b during welding, but also the welding can be carried out while fixing the first seating surface 22a so that it faces upward, and it is therefore possible to eliminate the need for changing the attitude of the trailing arm 12 and the lower arm 13, thereby enhancing the workability during welding. Moreover, since the first seating surface 22a and the second seating surface 13b are flat and can slide over each other, the relative positions thereof can be changed easily.

In particular, since the weld w2 is present along the inner periphery of the closed opening 13d of the second seating surface 13b of the lower arm 13, the starting point of the weld bead, which is a drawback in terms of the strength, can be eliminated, thus further improving the reliability of the weld w2. Moreover, since the length of the weld bead is approximately halved compared with that of the conventional arrangement explained by reference to FIG. 7 and FIG. 8, the operation time can be shortened and the cost can be reduced.

Furthermore, since it is unnecessary to bifurcate the outer end part of the lower arm 13 so as to sandwich a rear end part of the trailing arm 12 from above and below, the height of the outer end part of the lower arm 13 can be made to substantially coincide with the height of the rear end part of the trailing arm 12, thus reducing the vertical dimension of the outer end part of the lower arm 13 to increase the degrees of freedom in design.

Although an embodiment of the present invention is explained in detail above, the present invention can be modified in a variety of ways without departing from the spirit and scope of the present invention.

Figure 6:
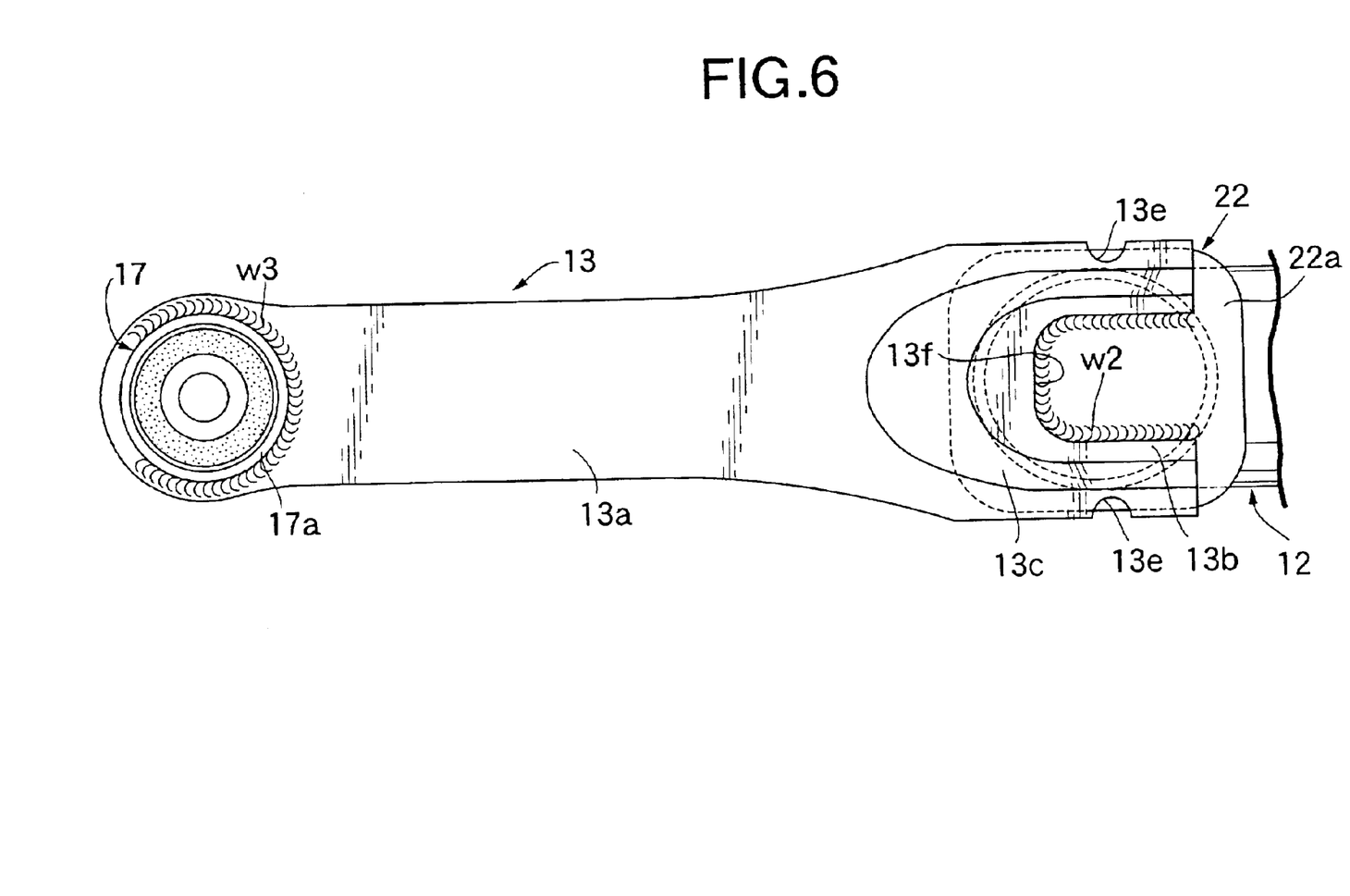
FIG. 6 is a view of a second embodiment, corresponding to FIG. 2.

For example, in the embodiment the opening 13d of the second seating surface 13b of the lower arm 13 has a round-cornered rectangular shape, but it may have a circular shape. Instead of the opening 13d, it is also possible to form a U-shaped channel 13f opening toward the outer end of the lower arm 13, as in a second embodiment shown in FIG. 6.

What is claimed is:

1. A vehicular suspension comprising:

a trailing arm pivotably supported at its front end on a vehicle body via an elastic joint and extending from the front end toward the rear of the vehicle body; and a substantially plate-like flexible arm extending in the vehicle width direction with its inner end pivotably supported on the vehicle body and its outer end fixed to a rear part of the trailing arm, the outer end of the flexible arm flexing rearward due to a rearward braking load acting on a rear part of the trailing arm when a wheel is braked, thereby allowing the elastic joint to move rearward and inward so as to make the wheel toe-in;

wherein a flat first seating surface provided at the rear end of the trailing arm is superimposed on a flat second seating surface provided at the outer end of the flexible arm, and an inner periphery of a closed opening formed on the second seating surface or an inner periphery of a channel with one end open formed on the second seating surface is welded to the first seating surface.

2. The vehicular suspension according to claim 1 wherein the second seating surface projects relative to a main body portion of the flexible arm in the thickness direction of the flexible arm.

* * * * *

UNITED STATES PATENT AND TRADEMARK OFFICE
CERTIFICATE OF CORRECTION

PATENT NO. : 6,843,492 B2
DATED : January 18, 2005
INVENTOR(S) : Inoue et al.

It is certified that error appears in the above-identified patent and that said Letters Patent is hereby corrected as shown below:

Column 1,
Line 44, change "w toe-in to stabilizes" to -- w toe-in to stabilize --;

Column 5,
Line 25, change "does nor affect" to -- does not affect --.

Signed and Sealed this

Seventeenth Day of May, 2005

JON W. DUDAS
*Director of the United States Patent and Trademark Office*